(12) United States Patent  (10) Patent No.: US 7,216,475 B2
Johnson                   (45) Date of Patent:     May 15, 2007

(54) AFT FLADE ENGINE

(75) Inventor: James Edward Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1459 days.

(21) Appl. No.: 10/719,884

(22) Filed: Nov. 21, 2003

(65) Prior Publication Data

US 2005/0109012 A1    May 26, 2005

(51) Int. Cl.
F02K 3/02    (2006.01)
F02K 1/38    (2006.01)

(52) U.S. Cl. ........................ 60/226.1; 60/262

(58) Field of Classification Search .................. 60/262, 60/805, 226.1
See application file for complete search history.

(56) References Cited

U.S. PATENT DOCUMENTS

| 2,405,919 A | * | 8/1946 | Whittle ........................ 60/262 |
| 3,282,053 A | * | 11/1966 | Messerschmitt ............. 60/263 |
| 3,332,241 A | * | 7/1967 | Coplin ...................... 60/226.1 |
| 3,348,379 A | * | 10/1967 | Wilde et al. ............... 60/226.1 |
| 3,673,802 A | | 7/1972 | Krebs et al. |
| 3,938,328 A | * | 2/1976 | Klees ......................... 60/262 |
| 4,043,121 A | | 8/1977 | Thomas et al. |
| 4,068,471 A | | 1/1978 | Simmons |
| 4,222,235 A | | 9/1980 | Adamson et al. |
| 4,232,515 A | | 11/1980 | Brown |
| 4,463,772 A | | 8/1984 | Ball |
| 4,592,201 A | * | 6/1986 | Dusa et al. .................... 60/262 |
| 5,261,227 A | | 11/1993 | Giffin, III |
| 5,388,964 A | | 2/1995 | Ciokajlo et al. |
| 5,402,638 A | | 4/1995 | Johnson |

(Continued)

FOREIGN PATENT DOCUMENTS

EP    0 567 277 A1    10/1993

OTHER PUBLICATIONS

"Aircraft Gas Turbine Engines Of The World And Dictionary Of The Gas Turbine", Charles E. Otis, M. Ed. and Peter A. Vosbury, M. Ed., Order No. EA-390, International Standard Book No. 0-89100-390-8,IAP, Inc., 1991, pp. 182, 183, 187.

"The Lore Of Flight", Mallard Press, BDD Promotional Books Company, Inc., 1971, p. 1259 1260.

(Continued)

Primary Examiner—Ehud Gartenberg
(74) Attorney, Agent, or Firm—William Scott Andes; Steven J. Rosen

(57) ABSTRACT

An aft FLADE gas turbine engine includes a fan section drivenly connected to a low pressure turbine section, a core engine located between the fan section and the low pressure turbine section, a fan bypass duct circumscribing the core engine and in fluid communication with the fan section, and a mixer downstream of the low pressure turbine section and in fluid communication with the fan bypass duct, and an aft FLADE turbine downstream of the mixer. At least one row of aft FLADE fan blades disposed radially outwardly of and connected to the aft FLADE turbine and radially extending across a FLADE duct circumscribing the fan bypass duct. The aft FLADE turbine may be a free turbine or connected to and rotatable with the low pressure turbine section. A power extraction apparatus may be disposed within the engine and drivenly connected to the aft FLADE turbine.

54 Claims, 11 Drawing Sheets

U.S. PATENT DOCUMENTS

| | | |
|---|---|---|
| 5,404,713 A | 4/1995 | Johnson |
| 5,794,432 A | 8/1998 | Dunbar et al. |
| 5,806,303 A | 9/1998 | Johnson |
| 5,809,772 A | 9/1998 | Giffin, III et al. |
| 5,931,636 A | 8/1999 | Savage et al. |
| 6,292,763 B1 | 9/2001 | Dunbar et al. |

OTHER PUBLICATIONS

"Types Of Turbine Engines", A&P Corner, Aircraft & Powerplant Corner, http://home.swipnet.se/-w-65189/turbine_engines/types_of_engines.htm, Oct. 3, 2003, 4 pages.

"Aircraft Gas Turbine Engine Technology", Second Edition, Irwin E. Treager, 1979, pp. 33-38.

* cited by examiner

AFT FLADE ENGINE

BACKGROUND OF THE INVENTION

1. Field of the Invention

This invention relates to aircraft gas turbine engines and, more particularly, to FLADE engines.

2. Description of Related Art

High performance variable cycle gas turbine engines are being designed because of their unique ability to operate efficiently at various thrust settings and flight speeds both subsonic and supersonic. An important feature of the variable cycle gas turbine engine which contributes to its high performance is its capability of maintaining a substantially constant inlet airflow as its thrust is varied. This feature leads to important performance advantages under less than full power engine settings or maximum thrust conditions, such as during subsonic cruise.

One particular type of variable cycle engine called a FLADE engine (FLADE being an acronym for "fan on blade") is characterized by an outer fan driven by a radially inner fan and discharging its FLADE air into an outer fan duct which is generally co-annular with and circumscribes an inner fan duct circumscribing the inner fan. One such engine, disclosed in U.S. Pat. No. 4,043,121, entitled "Two Spool Variable Cycle Engine", by Thomas et al., provides a FLADE fan and outer fan duct within which variable guide vanes control the cycle variability by controlling the amount of air passing through the FLADE outer fan duct. Other high performance aircraft variable cycle gas turbine FLADE engines capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. Examples of these are disclosed in U.S. Pat. No. 5,404,713, entitled "Spillage Drag and Infrared Reducing Flade Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0,567,277, entitled "Bypass Injector Valve For Variable Cycle Aircraft Engines". A FLADE aircraft gas turbine engine with counter-rotatable fans is disclosed in U.S. patent application Ser. No. (10/647,881), entitled "FLADE GAS TURBINE ENGINE WITH COUNTER-ROTATABLE FANS".

FLADE engines have the fan blade attached to one of the front fans. This can lead to low pressure spool designs that are compromised because of the limitations in rotor speeds and increased stresses caused by the FLADE blade attachment and location. The front fan mounted FLADE fan blades also are difficult to adapt to present engines or engine designs. It would be very expensive to adapt an existing engine to test a front fan mounted FLADE fan. It would be difficult to demonstrate some of the system benefits offered by a FLADE engine concept at a reasonable cost relative to that of a new low pressure system or defined around an existing core engine.

It is highly desirable to have a FLADE engine that allows a low pressure spool design that is uncompromised because of limitations in rotor speeds and increased stresses caused by the FLADE blade attachment and location. It is highly desirable to have an engine in which FLADE fan blades are not difficult to adapt to present engines or engine designs and that would not be very expensive to adapt to an existing engine to test as compared to a front fan mounted FLADE fan. It is also desirable to be able to demonstrate some of the system benefits offered by a FLADE engine concept without a great deal of difficulty and at a reasonable cost relative to that of a new low pressure system or defined around an existing core engine.

SUMMARY OF THE INVENTION

An aft FLADE gas turbine engine includes a fan section drivenly connected to a low pressure turbine section, a core engine located between the fan section and the low pressure turbine section, a fan bypass duct circumscribing the core engine and in fluid communication with the fan section, a mixer downstream of the low pressure turbine section and in fluid communication with the fan bypass duct, and an aft FLADE turbine downstream of the mixer. At least one row of aft FLADE fan blades is disposed radially outwardly of and drivenly connected to the aft FLADE turbine. The row of FLADE fan blades radially extend across a FLADE duct circumscribing the fan section.

More particular embodiments of the engine include a row of variable first FLADE vanes radially extending across the FLADE duct axially forwardly of the row of FLADE fan blades. One embodiment of the engine further includes a fan inlet to the fan section and an annular FLADE inlet to the FLADE duct arranged so that the FLADE inlet is axially located substantially aftwardly of the fan section and, in a more particular embodiment, the FLADE inlet is axially located aftwardly of the core engine. The aft FLADE turbine may be connected to and rotatable with a low pressure turbine of the low pressure turbine section or may be a free turbine. The engine may incorporate a variable area turbine nozzle with variable turbine nozzle vanes located aft and downstream of the mixer and the low pressure turbine.

A power extraction apparatus may be placed within the engine and drivenly connected to the aft FLADE turbine. In one embodiment, the power extraction apparatus may be located in a hollow engine nozzle centerbody of the engine located aft and downstream of the aft FLADE turbine. One embodiment of the power extraction apparatus is an electrical generator drivenly connected through a speed increasing gearbox to the aft FLADE turbine. Another embodiment of the power extraction apparatus is a power takeoff assembly including a housing disposed within the engine such as in the hollow engine nozzle centerbody and having a power takeoff shaft drivenly connected to the aft FLADE turbine through a right angle gearbox.

A variable or fixed throat area engine nozzle may be incorporated downstream and axially aft of the mixer and the fan bypass duct. Another more particular embodiment of the engine includes a plurality of circumferentially disposed hollow struts in fluid flow communication with the FLADE duct and a substantially hollow centerbody supported by and in fluid flow communication with the hollow struts. Cooling apertures in the centerbody and in a wall of the engine nozzle downstream of the variable throat area are in fluid communication with the FLADE duct.

A variable area FLADE air nozzle including an axially translatable plug within the hollow centerbody and a radially outwardly positioned fixed nozzle cowling of the centerbody may also be used in the engine. Aft thrust augmenting afterburners may be incorporated aft and downstream of the aft FLADE turbine. A forward afterburner may be axially disposed between the mixer and the aft FLADE turbine to provide additional energy upon demand to the aft FLADE turbine and additional power to the row of aft FLADE fan blades and the power extraction apparatus such as the electrical generator or the power takeoff assembly.

The aft FLADE gas turbine engine may be used within a fuselage of the aircraft. FLADE air intakes and an engine air intake may be mounted flush with respect to the fuselage. The FLADE air intakes are axially offset from the engine air intake. The engine air intake may be connected to and in fluid communication with the fan inlet by an engine fixed inlet duct. The FLADE air intakes may be connected to and in fluid communication with the FLADE inlets by FLADE fixed inlet ducts. Inlet duct passages of the engine and the FLADE fixed inlet ducts respectively may be two-dimensional and terminating in transition sections between the inlet duct passages and the fan and FLADE inlets respectively.

The aft FLADE turbine allows a FLADE engine to have a low pressure spool design that is uncompromised because of limitations in rotor speeds and increased stresses caused by the FLADE blade attachment and location. FLADE fan blades mounted on the aft FLADE turbine are not difficult to adapt to present engines or engine designs. The aft FLADE turbine is not very expensive to adapt to an existing engine to test as compared to a front fan mounted FLADE fan. It is also easier to demonstrate some of the system benefits offered by a FLADE engine concept without a great deal of difficulty and at a reasonable cost relative to that of a new low pressure system or defined around an existing core engine.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
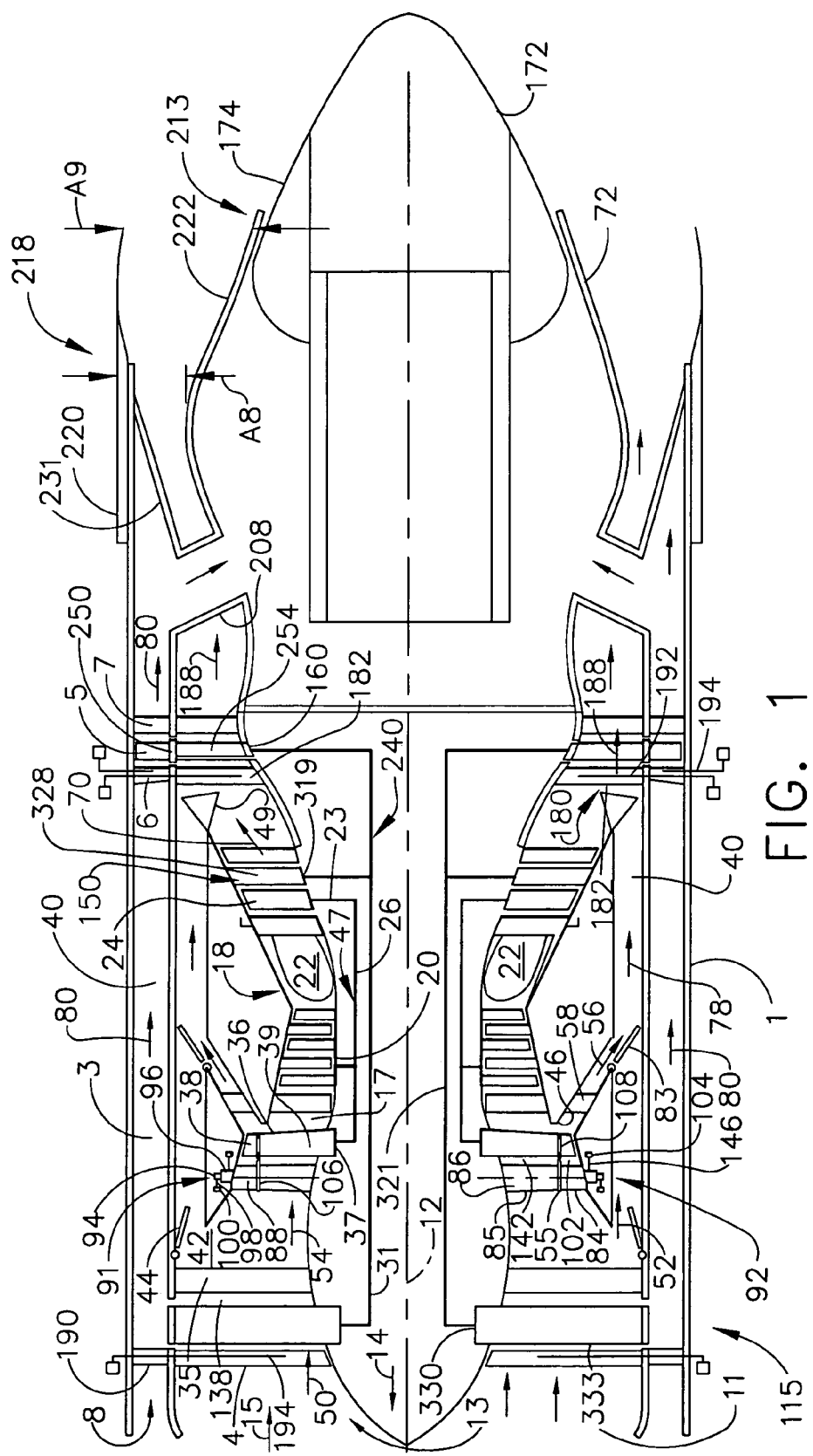
FIG. 1 is a schematical cross-sectional view illustration of a FLADE aircraft gas turbine engine with a single direction of rotation fan section and an aft FLADE blade and turbine.

Schematically illustrated in cross-section in FIG. 1 is an aircraft aft FLADE engine 1 having a fan section 115 with a single direction of rotation fan 330 downstream of variable inlet guide vanes 4. Downstream and axially aft of the fan section 115 is a core engine 18 having an annular core engine inlet 17 and a generally axially extending axis or centerline 12 generally extending forward 14 and aft 16. A fan bypass duct 40 located downstream and axially aft of the fan section 115 circumscribes the core engine 18. A FLADE duct 3 circumscribes the fan section 115 and the fan bypass duct 40. Fairings 190 disposed across the FLADE duct 3 surround variable vane shafts 194 passing through the FLADE duct 3 that are used to vary and control the pitch of the variable inlet guide vanes 4.

The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 1, fixedly interconnects the high pressure compressor 20 and the high pressure turbine blades 24. The combination or assembly of the core driven fan 37 and the high pressure compressor 20 drivenly connected to the high pressure turbine 23 by the high pressure shaft 26 is designated a high pressure spool 47. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into single direction of rotation low pressure turbine 319 having at least one row of low pressure turbine blades 328. The low pressure turbine 319 is drivingly connected to the single direction of rotation fan 330 by a low pressure shaft 321, the combination or assembly being designated a first low pressure spool 240. The single direction of rotation fan 330 has at least one row of generally radially outwardly extending and circumferentially spaced-apart fan blades 333.

A mixer 49, illustrated as a lobed or chute mixer, is disposed downstream of and at an aft end of the fan bypass duct 40 and downstream of and aft of the low pressure turbine blades 328 of the low pressure turbine 319. The mixer 49 is used to mix bypass air 78 with core discharge air 70 from the low pressure turbine 319 to form a mixed flow 188. One alternative version of the mixer 49 is an aft variable area bypass injector (VABI) door disposed at an aft end of the fan bypass duct 40 to mix bypass air 78 with core discharge air 70. Aft VABI doors are typically circumferentially disposed between hollow struts 208 which structurally support and flow air to a hollow engine nozzle centerbody 72.

Exhaust gases from the mixer 49 are directed through an aft FLADE turbine 160 having a plurality of FLADE turbine blades 254 and located downstream and aft of the mixer 49. A FLADE fan 2 includes at least one row of aft FLADE fan blades 5 extend radially outwardly from and are drivenly connected to the aft FLADE turbine 160 across a FLADE duct 3 disposed radially outwardly of and circumscribing the fan bypass duct 40. A FLADE airflow 80 is powered by the FLADE fan blades 5 and put to use downstream of the FLADE fan blades 5. The FLADE fan blades 5 extend radially outwardly from an annular rotatable FLADE turbine shroud 250 attached to and circumscribing the FLADE turbine blades 254 of the aft FLADE turbine 160. The FLADE turbine shroud 250 separates the FLADE fan blades 5 from the FLADE turbine blades 254.

Figure 2:
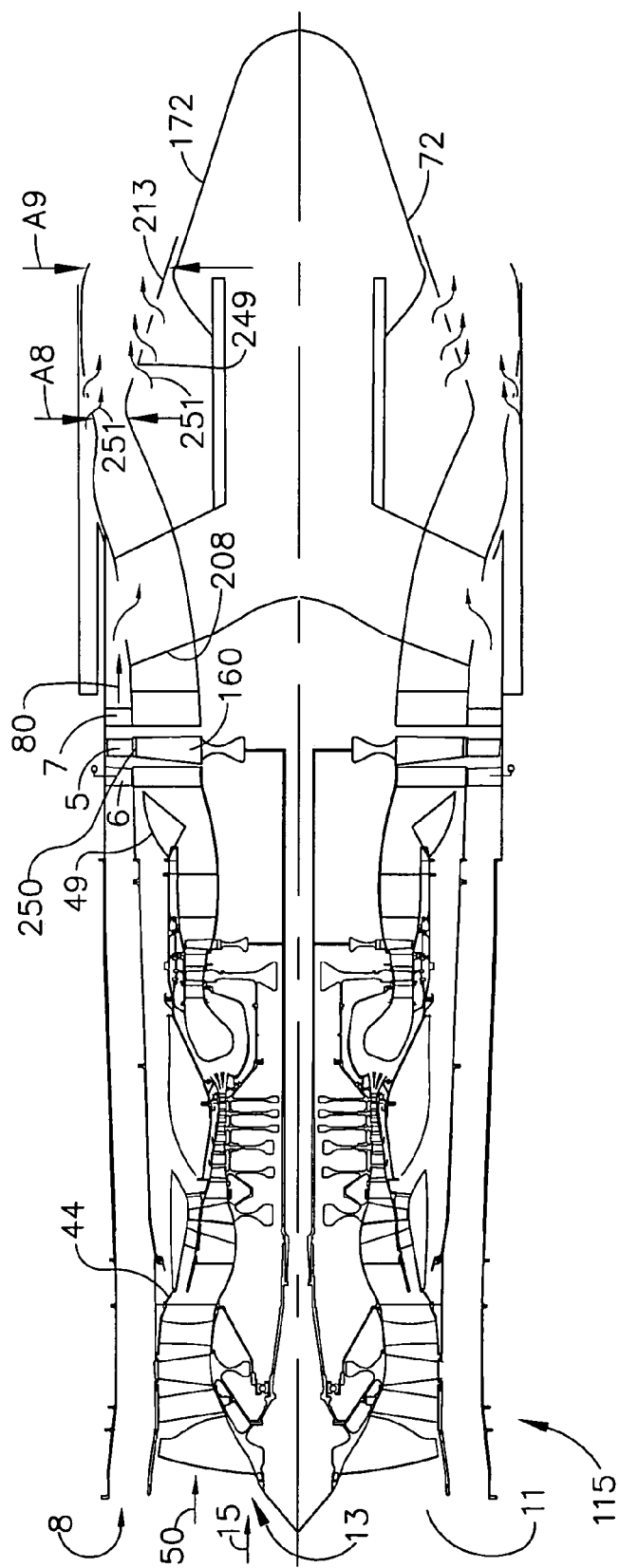
FIG. 2 is an alternative schematical cross-sectional view illustration of the engine in FIG. 2 with exhaust nozzle cooling.

The embodiment of the engine 1 illustrated in FIGS. 1 and 2 have what is referred to as a long FLADE duct 3 that extends forwardly from the FLADE fan blades 5 to a fan inlet 11 to the fan section 115. The fan inlet 11 together with an annular FLADE inlet 8 to the FLADE duct 3 generally form an engine inlet 13. The aft FLADE turbine 160 is illustrated, in FIGS. 1 and 2, drivingly connected to the low pressure shaft 321 and, thus, rotatable with the low pressure turbine 319. Alternatively, the aft FLADE turbine 160 may be a free turbine not connected to either of the low or high pressure shafts as illustrated in FIGS. 5–7 and 9–10.

Referring to FIG. 1, a row of variable first FLADE vanes 6 is located within the FLADE duct 3 axially forwardly and upstream of the row of FLADE fan blades 5 to control a FLADE airflow 80 through the FLADE duct 3. Variable vane shafts 194 are used to vary and control the pitch of the variable first FLADE vanes 6. A row of second FLADE vanes 7 is illustrated in FIG. 1 as being fixed but may be variable. The row of second FLADE vanes 7 is also located within the FLADE duct 3 but axially aftwardly and downstream of the row of FLADE fan blades 5. The second FLADE vanes 7 are used to deswirl the FLADE airflow 80.

Too much air or too little air passing through the fan inlet 11 is detrimental to aircraft system performance. The aft FLADE fan blades 5 of the FLADE fan 2 and the FLADE duct 3 are designed and operated to help manage the inlet airflow delivered by the inlet to the fans. The aft FLADE turbine 160 and the FLADE fan blades 5 of the FLADE fan 2 are used to allow the engine 1 to be operated in an optimum and efficient manner at all flight conditions. The fan inlet 11 is sized to receive essentially full engine airflow 15 of the engine at full power conditions. The FLADE airflow 80 controlled by the variable first FLADE vanes 6 can be scheduled from a maximum level to a minimum level at a constant rotor speed of the FLADE turbine 160.

An optional variable area turbine nozzle 180 with variable turbine nozzle vanes 182 is illustrated in FIG. 1 located downstream of the mixer 49 and the low pressure turbine 319 and immediately upstream of and at an entrance to the aft FLADE turbine 160. Variable area nozzle vane shafts 192 that are used to vary and control the pitch of the variable turbine nozzle vanes 182 pass through the variable vane shafts 194 that are used to vary and control the pitch of the variable first FLADE vanes 6.

Referring to FIGS. 1 and 2, a first bypass inlet 42 to the fan bypass duct 40 is disposed axially between the fan section 115 and the core driven fan 37. The fan blades 333 of the fan 330 radially extend across a first fan duct 138. A row of circumferentially spaced-apart fan stator vanes 35 radially extend across the first fan duct 138, downstream of the fan blades 333, and axially between the fan blades 333 and the first bypass inlet 42 to the fan bypass duct 40. The row of the core driven fan blades 36 of the core driven fan 37 radially extend across an annular second fan duct 142. The second fan duct 142 begins axially aft of the first bypass inlet 42 and is disposed radially inwardly of the fan bypass duct 40. An annular first flow splitter 45 is radially disposed between the first bypass inlet 42 and the second fan duct 142.

The full engine airflow 15 is split between the FLADE inlet 8 and the fan inlet 11. A fan airflow 50 passes through the fan inlet 11 and then the fan section 115. A first bypass air portion 52 of the fan airflow 50 passes through the first bypass inlet 42 of the fan bypass duct 40 when a front variable area bypass injector (VABI) door 44 in the first bypass inlet 42 is open and with the remaining air portion 54 passing through the core driven fan 37 and its row of core driven fan blades 36.

A row of circumferentially spaced-apart core driven fan stator vanes 34 within the second fan duct 142 are disposed axially between the row of second fan blades 32 and the core driven fan blades 36 of the core driven fan 37. The row of the core driven fan stator vanes 34 and the core driven fan blades 36 of the core driven fan 37 are radially disposed across the second fan duct 142. A vane shroud 106 divides the core driven fan stator vanes 34 into radially inner and outer vane hub and tip sections 85 and 84, respectively. The fan shroud 108 divides the core driven fan blades 36 into the radially inner and outer blade hub and tip sections 39 and 38, respectively.

A second bypass airflow portion 56 is directed through a fan tip duct 146 across the vane tip sections 84 of the core driven fan stator vanes 34 and across the blade tip sections 38 of the core driven fan blades 36 into a second bypass inlet 46 of a second bypass duct 58 to the fan bypass duct 40. An optional middle variable area bypass injector (VABI) door 83 may be disposed at an aft end of the second bypass duct 58 for modulating flow through the second bypass inlet 46 to the fan bypass duct 40.

The fan tip duct 146 includes the vane and fan shrouds 106 and 108 and a second flow splitter 55 at a forward end of the vane shroud 106. First and second varying means 91 and 92 are provided for independently varying flow areas of the vane hub and tip sections 85 and 84, respectively. Exemplary first and second varying means 91 and 92 include independently variable vane hub and tip sections 85 and 84, respectively (see U.S. Pat. No. 5,806,303). The independently variable vane hub and tip sections 85 and 84 designs may include having the entire vane hub and tip sections 85 and 84 be independently pivotable. Other possible designs are disclosed in U.S. Pat. Nos. 5,809,772 and 5,988,890.

Another embodiment of the independently variable vane hub and tip sections 85 and 84 includes pivotable trailing-edge hub and tip flaps 86 and 88 of the independently variable vane hub and tip sections 85 and 84. The first and second varying means 91 and 92 can include independently pivoting flaps. Alternative varying means for non-pivotable, fan stator vane designs include axially moving unison rings and those means known for mechanical clearance control in jet engines (i.e., mechanically moving circumferentially surrounding shroud segments radially towards and away from a row of rotor blade tips to maintain a constant clearance despite different rates of thermal expansion and contraction). Additional such varying means for non-pivotable, fan stator vane designs include those known for extending and retracting wing flaps on airplanes and the like.

Exemplary first and second varying means 91 and 92, illustrated in FIG. 1, include an inner shaft 94 coaxially disposed within an outer shaft 96. The inner shaft 94 is rotated by a first lever arm 98 actuated by a first unison ring 100. The outer shaft 96 is rotated by a second lever arm 102 actuated by a second unison ring 104. The inner shaft 94 is attached to the pivotable trailing edge hub flap 86 of the vane hub section 85 of the fan stator vane 34. The outer shaft 96 is attached to the pivotable trailing edge tip flap 88 of the vane tip section 84 of the fan stator vane 34. It is noted that the lever arms 98 and 102 and the unison rings 100 and 104 are all disposed radially outward of the fan stator vanes 34. Other such pivoting means include those known for pivoting variable stator vanes of high pressure compressors in jet engines and the like.

Referring to FIGS. 1 and 2 by way of example, a variable throat area engine nozzle 218, having a variable throat area A8, is downstream and axially aft of the aft FLADE turbine 160 and the fan bypass duct 40. The engine nozzle 218 includes an axially translatable radially outer annular convergent and divergent wall 220 spaced radially outwardly apart from a radially fixed and axially translatable annular inner wall 222 on the centerbody 72. The translatable radially outer annular convergent and divergent wall 220 controls a throat area A8 between the outer annular convergent and divergent wall 220 and the radially fixed and axially translatable annular inner wall 222. The translatable radially outer annular convergent and divergent wall 220 also controls a nozzle exit area A9 of the engine nozzle 218. Alternatively, a variable throat area convergent/divergent nozzle with flaps may be used as disclosed in U.S. Pat. No. 5,404,713.

The plurality of circumferentially disposed hollow struts 208 are in fluid communication with and operable to receive air from the FLADE duct 3. The hollow struts 208 structurally support and flow air to the centerbody 72 which is substantially hollow. A variable area FLADE air nozzle 213 includes an axially translatable plug 172 which cooperates with a radially outwardly positioned fixed nozzle cowling 174 of the centerbody 72 to exhaust FLADE airflow 80 received from the hollow struts 208 and return work to the engine in the form of thrust.

FIGS. 2, 3, 6, and 7 illustrate a nozzle cooling arrangement in which at least some of the FLADE airflow 80 is used as cooling air 251 which flowed through the hollow struts 208 into the substantially hollow centerbody 72. The cooling air 251 is then flowed through cooling apertures 249 in the centerbody 72 downstream of the variable throat area A8 to cool an outer surface of the centerbody. Some of the, FLADE airflow 80 may also be used as cooling air 251 for cooling the radially annular outer wall 220 of the engine nozzle 218 downstream of the variable throat area A8 in the same manner. Cooling of the annular outer wall 220 and the hollow centerbody 72 is helpful when thrust augmenting afterburners 224, such as those illustrated in FIG. 7, aft and downstream of the aft FLADE turbine 160 are ignited. The apertures may be angled to provide film cooling along the centerbody 72 and/or the hollow struts 208. Holes, shaped and angled holes, and slots and angled slots are among the types of cooling apertures 249 that may be used.

The augmenter includes an exhaust casing 231 and liner 234 within which is defined a combustion zone 236. The thrust augmenting afterburner 224 is mounted between the turbines and the exhaust nozzle for injecting additional fuel when desired during reheat operation for burning in the augmenter for producing additional thrust. In a bypass turbofan engine, an annular bypass duct extends from the fan to the augmenter for bypassing a portion of the fan air around the core engine to the augmenter. The bypass air is used in part for cooling the exhaust liner and also is mixed with the core gases prior to discharge through the exhaust nozzle.

Various types of flameholders are known and typically include radial and circumferential V-shaped gutters which provide local low velocity recirculation and stagnation regions therebehind, in otherwise high velocity core gas flow, for sustaining combustion during reheat operation. Since the core gases are the product of combustion in the core engine, they are initially hot when they leave the turbine, and are further heated when burned with the bypass air and additional fuel during reheat operation.

Figure 3:
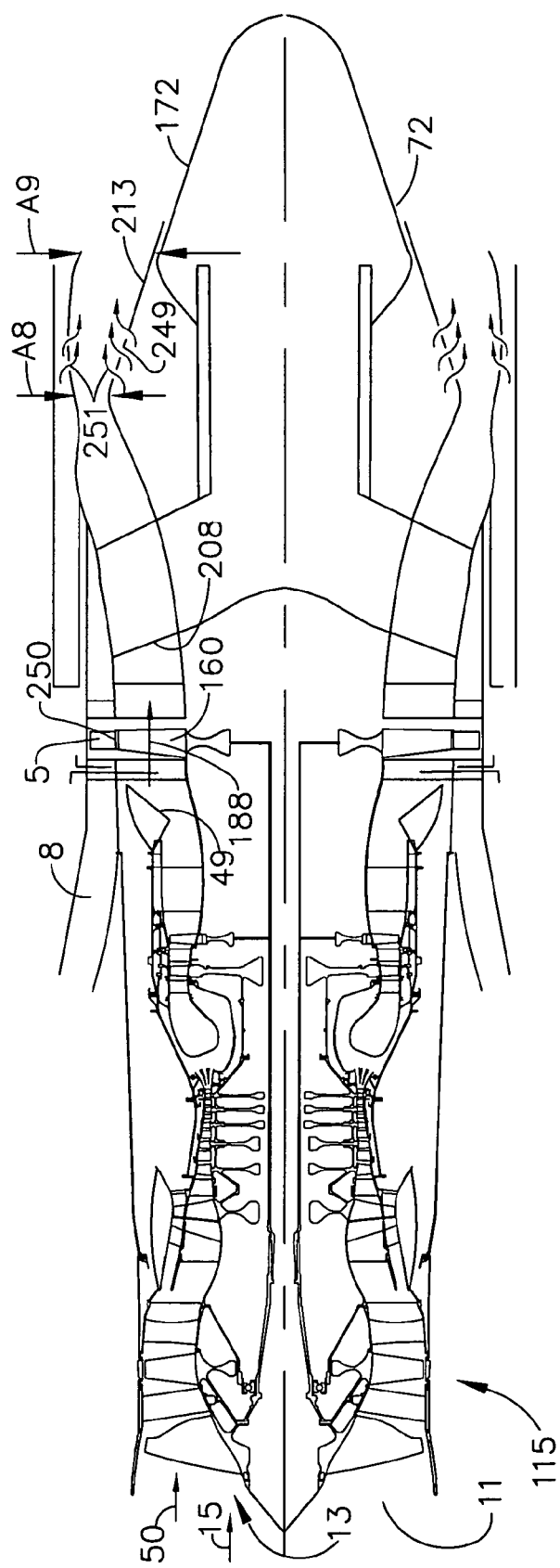
FIG. 3 is a schematical cross-sectional view illustration of an aircraft gas turbine engine with an aft FLADE blade and turbine and a short FLADE duct.
Figure 4:
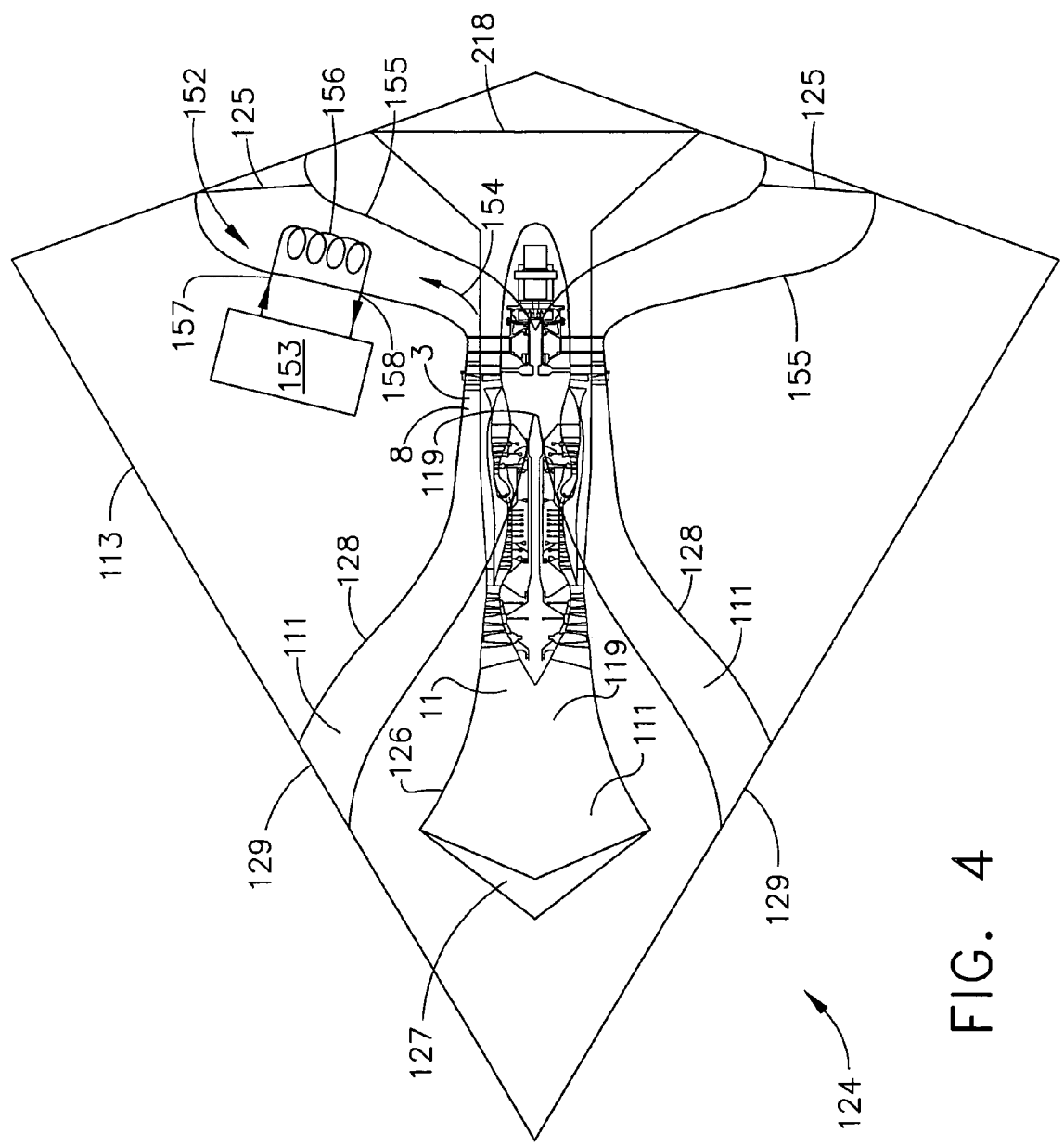
FIG. 4 is a schematical cross-sectional view illustration of the short aft duct FLADE gas turbine engine in FIG. 3 installed in an aircraft.

Illustrated in FIGS. 3 and 4 is an embodiment of the engine 1 in which the fan inlet 11 to the fan section 115 is axially offset from the annular FLADE inlet 8 to the FLADE duct 3. The exemplary axially offset FLADE inlet 8 is illustrated as being axially located substantially aftwardly of the fan section 115 and, more particularly, it is axially located aftwardly of the core engine 18. An aircraft 124 illustrated in FIG. 4 includes a single offset flush mounted engine air intake 127 connected to and in fluid communication with the annular fan inlet 11 by an engine fixed inlet duct 126. Flush mounted dual FLADE air intakes 129 are connected to and in fluid communication with the annular FLADE inlets 8 by FLADE fixed inlet ducts 128. The FLADE air intakes 129 are axially offset from the engine air intake 127. This provides great flexibility in designing and constructing efficient engines, aircraft, and aircraft with engines completely mounted within the aircraft's fuselage 113 or body and the FLADE air intakes 129 and the engine air intake 127 are mounted flush with respect to the fuselage 113. Also note that the FLADE duct 3 leads to separate FLADE exhaust nozzles 125 that are offset from the engine nozzle 218 which may be a variable or fixed throat area engine nozzle. Inlet duct passages 111 of the engine and FLADE fixed inlet ducts 126 and 128 may be two-dimensional terminating in transition sections 119 between the inlet duct passages 111 and the axisymmetric annular fan and FLADE inlets 11 and 8. The FLADE airflow 80 may be also used as a heat sink for aircraft systems cooling purposes because it is a good source of pressurized cooling air. An example of this feature is illustrated as an aircraft waste heat cooling system 152 having an aircraft waste heat source 153 cooled by Flade exhaust airflow 154 in at least one FLADE air exhaust duct 155 leading from the FLADE duct 3 to one of the FLADE exhaust nozzles 125. A heat exchanger 156 is positioned in the FLADE air exhaust duct 155 so it can be cooled by the pressurized Flade exhaust air 154. Hot and cold fluid pipes 157 and 158 respectively (ducts may be used for air to air heat exchangers) fluidly connect the waste heat source 153 to the heat exchanger 156.

Figure 5:
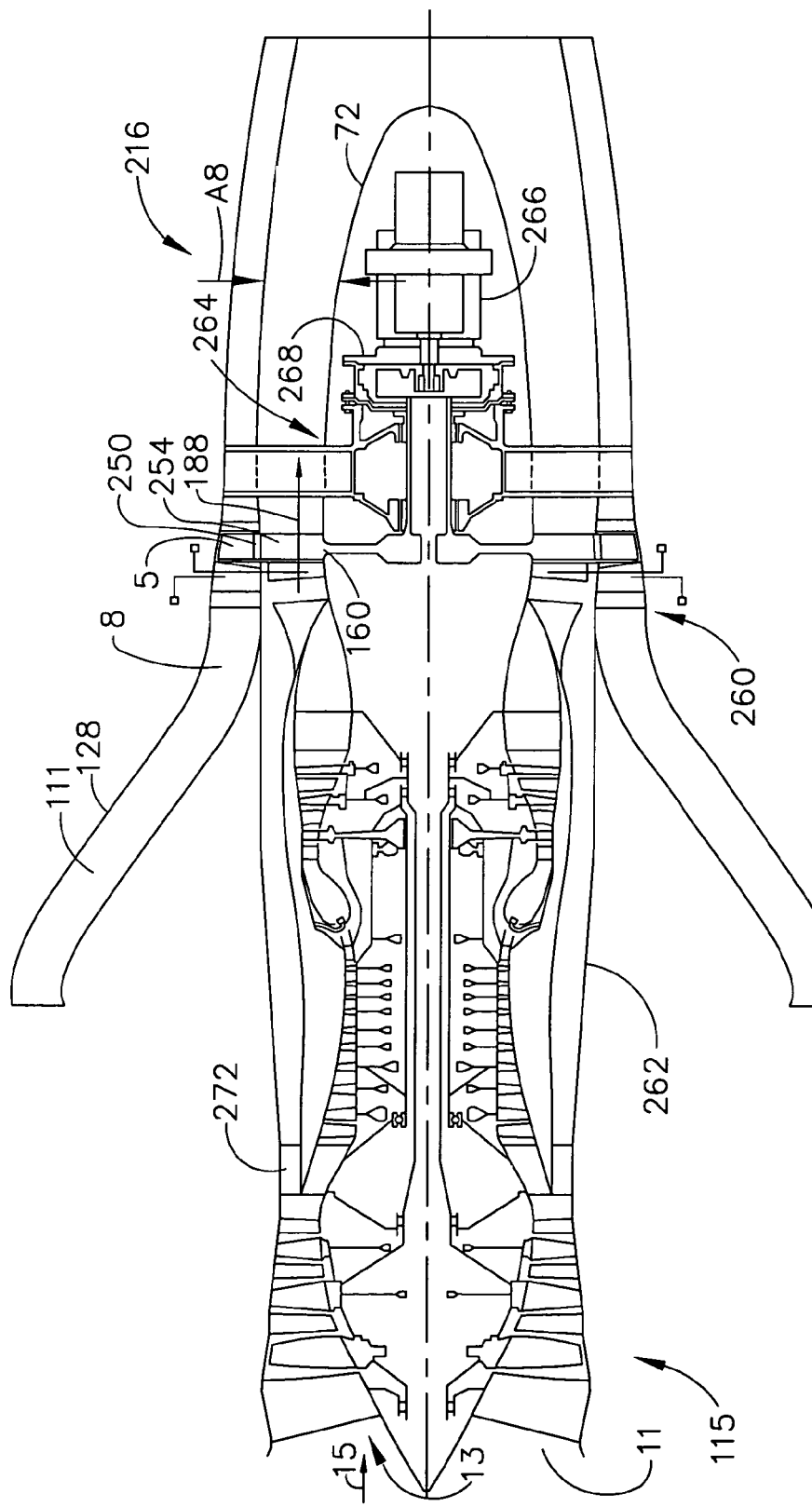
FIG. 5 is a schematical cross-sectional view illustration of a short duct aft FLADE turbine module having an aft FLADE turbine drivingly connected to an internally mounted electrical generator.
Figure 9:
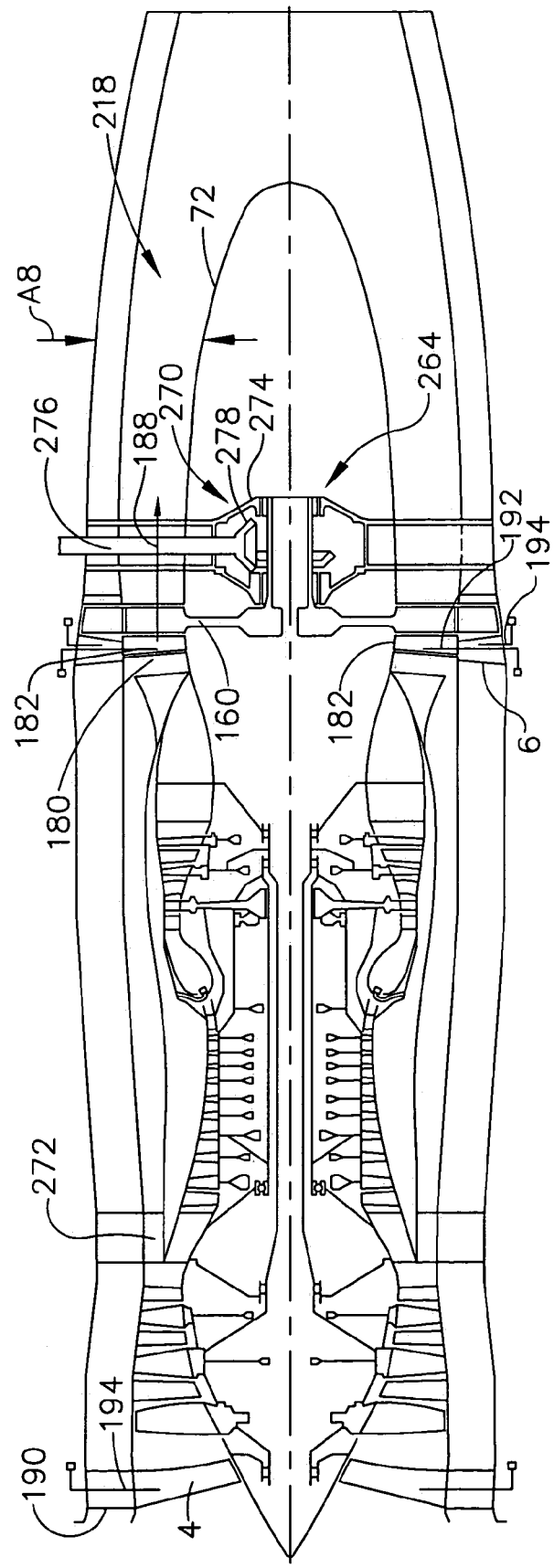
FIG. 9 is a schematical cross-sectional view illustration of a FLADE aircraft gas turbine engine with an aft FLADE blade and turbine driving connected to a power takeoff shaft.

Illustrated in FIG. 5 is a variation of the embodiment of the aft FLADE engine 1 illustrated in FIG. 3. A "bolt on" aft FLADE module 260 incorporates a free aft FLADE turbine 160 and can be added to an existing engine 262 for various purposes including but not limited to testing and design verification. Another feature illustrated in FIG. 5 is a FLADE power extraction apparatus 264, illustrated as an electrical generator 266 disposed within the engine 1 and drivenly connected through a speed increasing gearbox 268 to the aft FLADE turbine 160. The electrical generator 266 is illustrated as being located within the hollow engine nozzle centerbody 72 but may be placed elsewhere in the engine 1 as illustrated in FIG. 11. Another embodiment of the power extraction apparatus 264 is a power takeoff assembly 270, as illustrated in FIG. 9, including a housing 274 disposed within the hollow engine nozzle centerbody 72. A power takeoff shaft 276 is drivenly connected to the aft FLADE turbine 160 through a right angle gearbox 278 within the housing 274. A power takeoff shaft is typically used to drive accessory machinery mounted external to the engine such as gearboxes, generators, oil and fuel pumps. The FLADE power extraction apparatus 264 allows more flexibility in the design of the engine 1 so that the power used by the aft FLADE fan blades 5 is a small percentage of the power extracted by the aft FLADE turbine 160 from the mixed flow 188 and, therefore, varying and controlling the amount of the FLADE airflow 80 will have a small effect on the efficiency of the aft FLADE turbine 160. Also illustrated in FIG. 5, as well as in FIGS. 9 and 10, is a fixed throat area engine nozzle 216 axially aft of the mixer 49 and the fan bypass duct 40.

Figure 10:
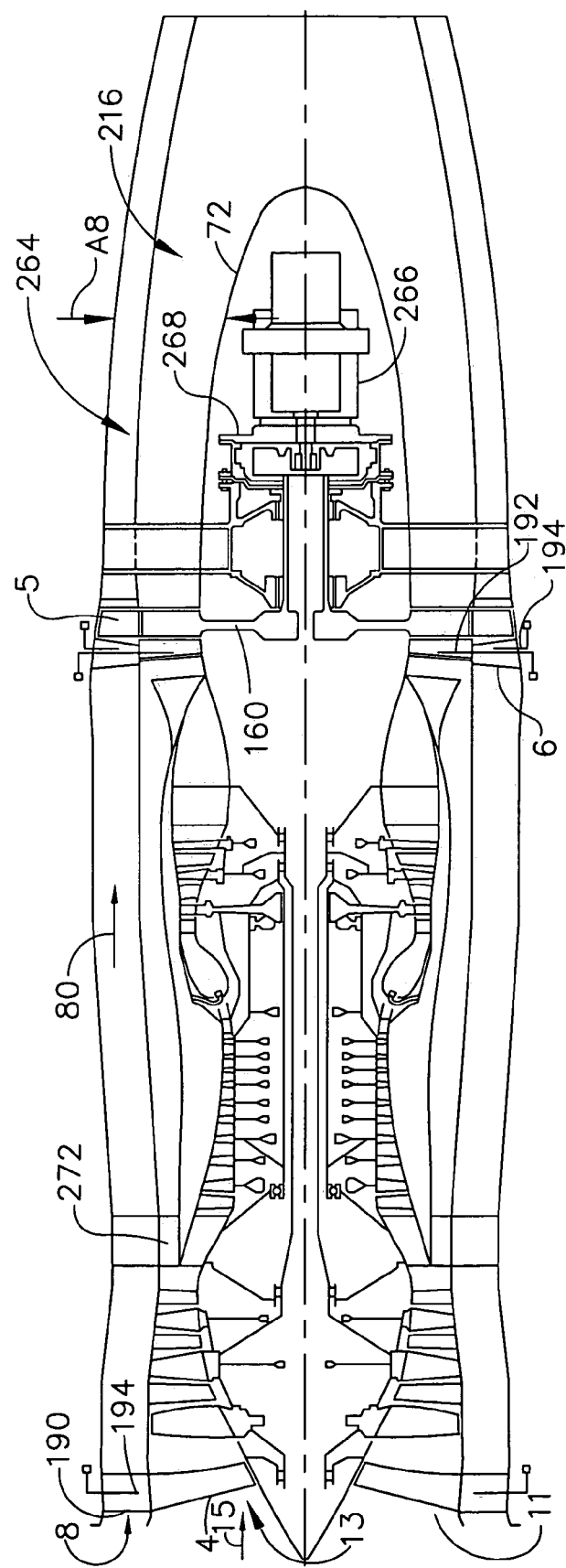
FIG. 10 is a schematical cross-sectional view illustration of a FLADE aircraft gas turbine engine with an aft FLADE blade and turbine driving connected to an electrical generator located within the engine.
Figure 11:
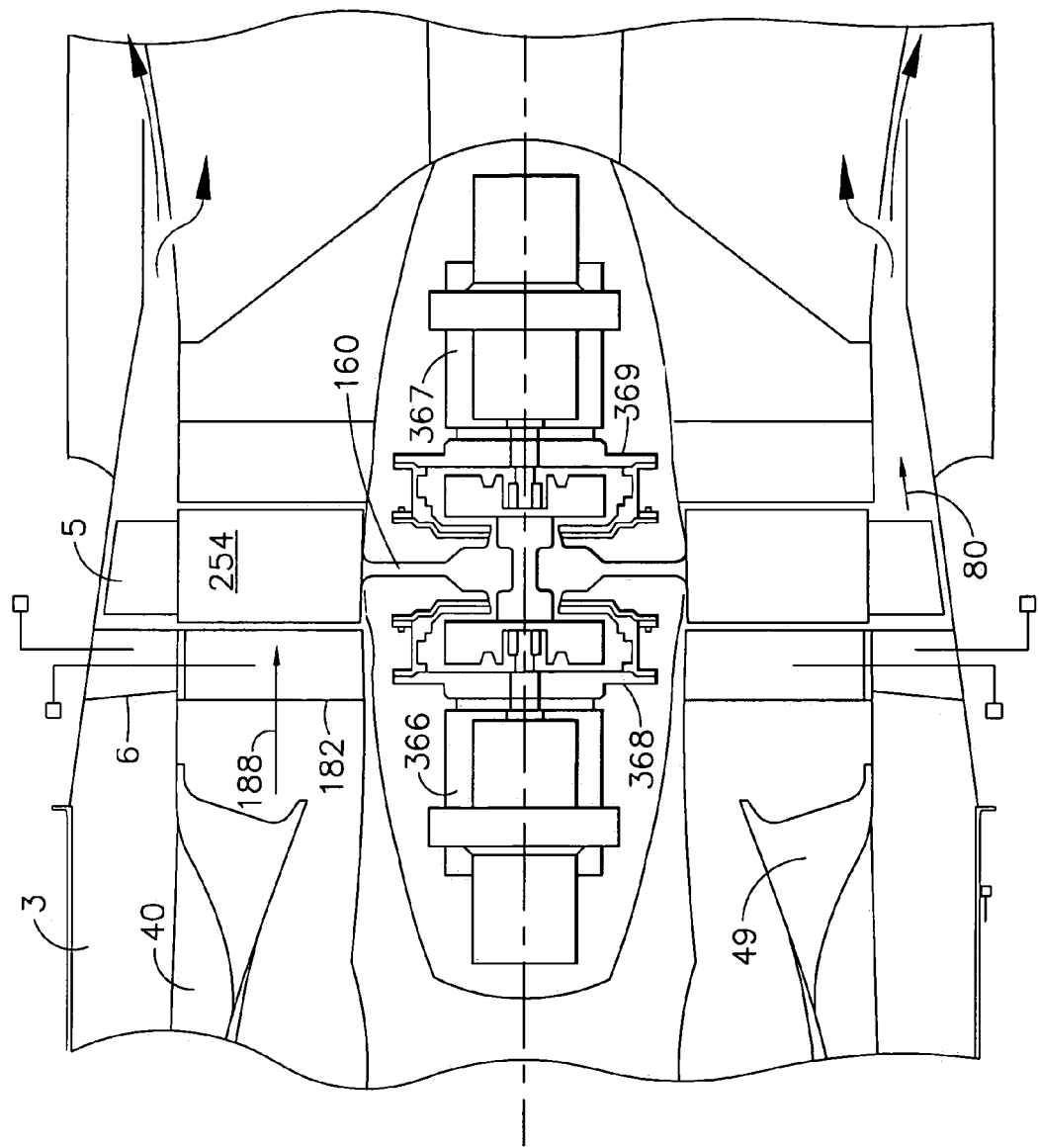
FIG. 11 is a schematical cross-sectional view illustration of a FLADE aircraft gas turbine engine with an aft FLADE blade and turbine driving connected to two electrical generators located within the engine.

Illustrated in FIG. 10 is an engine 1 with the FLADE inlet 8 and the fan inlet 11 axially located together and not axially offset from each other as the embodiments illustrated in FIGS. 3 and 5 and having the electrical generator 266 disposed within the hollow engine nozzle centerbody 72 and drivingly connected through the speed increasing gearbox 268 to the aft FLADE turbine 160. Also note that the engines 1 illustrated in FIGS. 5–7 and 9–10 are of the single bypass type having but a single bypass inlet 272 as compared to the engines 1 illustrated in FIGS. 1–3 having both the first and second bypass inlets 42 and 46 to the fan bypass duct 40.

Illustrated in FIG. 11 is a portion of an engine 1 with more than one FLADE power extraction apparatus 264 disposed within the engine 1. Forward and aft electrical generators 366 and 367 are disposed within the engine 1 forward and aft or downstream and upstream of the aft FLADE turbine 160. The forward and aft electrical generators 366 and 367 are drivenly connected through forward and aft speed increasing gearboxes 368 and 369 to the aft FLADE turbine 160. Also illustrated in FIGS. 9–11 is a fixed throat area engine nozzle 218 having a fixed throat area A8 downstream and axially aft of the aft FLADE turbine 160. Power extraction may be accomplished in such a fixed throat area engine with the variable first FLADE vanes 6 scheduled closed.

Figure 6:
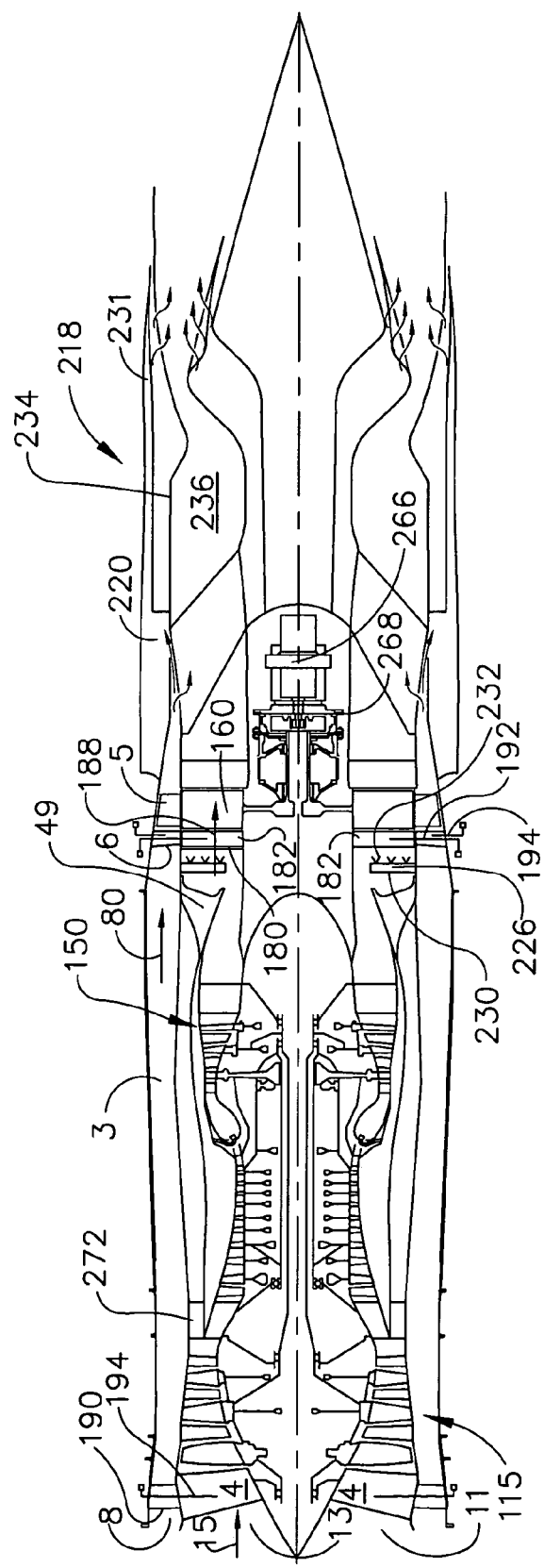
FIG. 6 is a schematical cross-sectional view illustration of a FLADE aircraft gas turbine engine with a first afterburner upstream of a free aft FLADE turbine.
Figure 7:
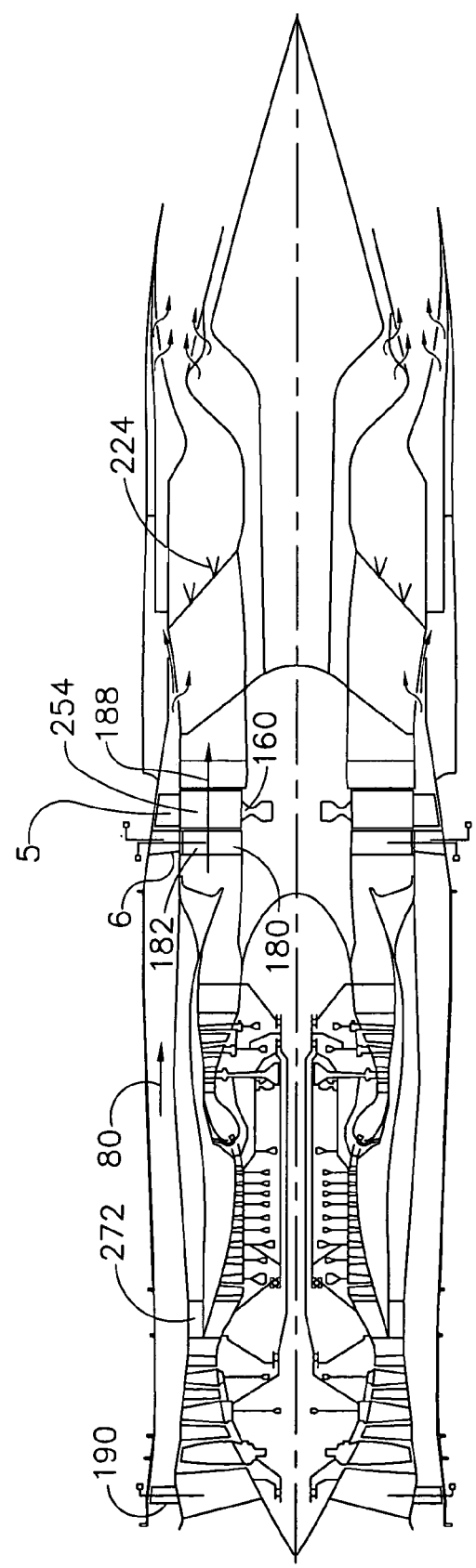
FIG. 7 is a schematical cross-sectional view illustration of an aft FLADE aircraft gas turbine engine with a variable area turbine nozzle and a thrust augmenting afterburner downstream of an aft FLADE turbine.

Illustrated in FIG. 6 is an engine 1 with a forward afterburner 226 axially disposed in the mixed flow 188 between the mixer 49 and the aft FLADE turbine 160. The forward afterburner 226 includes forward fuel spraybars 230 and forward flameholders 232. The forward afterburner 226 may be used to add additional energy to the mixed flow 188 upstream of the aft FLADE turbine 160 if more power is required for the aft FLADE turbine 160 to provide additional energy upon demand to the aft FLADE turbine 160 for the aft FLADE fan blades 5 and/or the power extraction apparatus 264 such as the electrical generator 266 or the power takeoff assembly 270.

Figure 8:
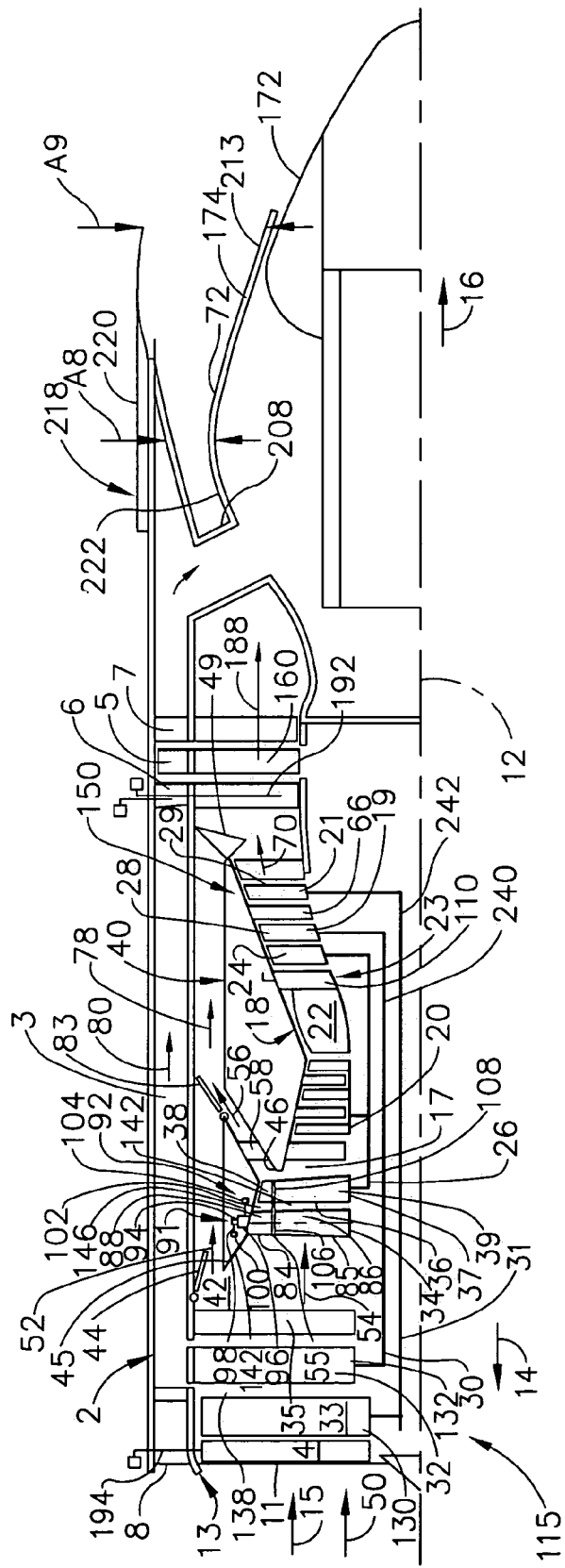
FIG. 8 is a schematical cross-sectional view illustration of a FLADE aircraft gas turbine engine with counter rotatable fans and an aft FLADE blade and turbine.

Schematically illustrated in cross-section in FIG. 8 is an aircraft aft FLADE engine 1 having a fan section 115 with first and second counter-rotatable fans 130 and 132. The variable first FLADE vanes 6 are used to control the amount of a FLADE airflow 80 allowed into the FLADE inlet 8 and the FLADE duct 3. Opening of the FLADE duct 3 by opening the first FLADE vanes 6 at part power thrust setting of the FLADE engine 1 allows the engine to maintain an essentially constant inlet airflow over a relatively wide range of thrust at a given set of subsonic flight ambient conditions such as altitude and flight Mach No. and also avoid spillage drag and to do so over a range of flight conditions. This capability is particularly needed for subsonic part power engine operating conditions.

The FLADE inlet 8 and the fan inlet 11 in combination generally form the engine inlet 13. Downstream and axially aft of the first and second counter-rotatable fans 130 and 132 is the core engine 18 having an annular core engine inlet 17 and a generally axially extending axis or centerline 12 generally extending forward 14 and aft 16. A fan bypass duct 40 located downstream and axially aft of the first and second counter-rotatable fans 130 and 132 circumscribes the core engine 18. The FLADE duct 3 circumscribes the first and second counter-rotatable fans 130 and 132 and the fan bypass duct 40.

One important criterion of inlet performance is the ram recovery factor. A good inlet must have air-handling characteristics which are matched with the engine, as well as low drag and good flow stability. For a given set of operating flight conditions, the airflow requirements are fixed by the pumping characteristics of the FLADE engine 1. During supersonic operation of the engine, if the area of the engine inlet 13 is too small to handle, the inlet airflow the inlet shock moves downstream of an inlet throat, particularly if it is a fixed inlet, and pressure recovery across the shock worsens and the exit corrected flow from the inlet increases to satisfy the engine demand. If the FLADE engine inlet area is too large, the engine inlet 13 will supply more air than the engine can use resulting in excess drag (spillage drag), because we must either by-pass the excess air around the engine or "spill" it back out of the inlet. Too much air or too little air is detrimental to aircraft system performance. The FLADE fan 2 and the FLADE duct 3 are designed and operated to help manage the inlet airflow delivered by the inlet to the fans.

The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 1, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into a low pressure turbine section 150 having counter-rotatable first and second low pressure turbines 19 and 21 with first and second rows of low pressure turbine blades 28 and 29, respectively. The second low pressure turbine 21 is drivingly connected to the first counter-rotatable fan 130 by a first low pressure shaft 30, the combination or assembly being designated a first low pressure spool 240. The first low pressure turbine 19 is drivingly connected to the second counter-rotatable fan 132 by a second low pressure shaft 31, the combination or assembly being designated a second low pressure spool 242. The second counter-rotatable fan 132 has a single row of generally radially outwardly extending and circumferentially spaced-apart second fan blades 32. The first counter-rotatable fan 130 has a single row of generally radially outwardly extending and circumferentially spaced-apart first fan blades 33. The FLADE fan blades 5 are primarily used to flexibly match inlet airflow requirements.

The high pressure turbine 23 includes a row of high pressure turbine (HPT) nozzle stator vanes 110 which directs flow from the combustor 22 to the row of high pressure turbine blades 24. Flow from the row of high pressure turbine blades 24 is then directed into counter-rotatable second and first low pressure turbines 21 and 19 and second and first rows of low pressure turbine blades 29 and 28, respectively. A row of low pressure stator vanes 66 are disposed between the second and first rows of low pressure turbine blades 29 and 28.

A row of fixed low pressure stator vanes 66 is disposed between the second and first rows of low pressure turbine blades 29 and 28. Alternatively, a row of variable low pressure stator vanes may be incorporated between the second and first rows of low pressure turbine blades 29 and 28. The first low pressure turbine 19 and its first row of low pressure turbine blades 28 are counter-rotatable with respect to the row of high pressure turbine blades 24. The first low pressure turbine 19 and its first row of low pressure turbine blades 28 are counter-rotatable with respect to the second low pressure turbine 21 and its second row of low pressure turbine blades 29. The aft FLADE turbine 160 is illustrated, in FIG. 8 as a free turbine not connected to a spool or fan in the fan section 115. Alternatively, the aft FLADE turbine 160 may be drivingly connected to the second low pressure shaft 31 of the second low pressure spool 242.

The engines illustrated herein are single and double bypass types and it is thought that a turbojet type may be used in which there is no bypass duct or bypass flow and the aft FLADE turbine would be placed downstream of any turbine section used to drive the fan and/or compressor. Turbojet type engines may also use augmenters and variable area two-dimensional nozzles.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An aft FLADE gas turbine engine comprising:
  a fan section drivenly connected to a low pressure turbine section,
  a core engine located between the fan section and the low pressure turbine section,
  a fan bypass duct circumscribing the core engine and in fluid communication with the fan section,
  a mixer downstream of the low pressure turbine section and in fluid communication with the fan bypass duct,
  an aft FLADE turbine downstream of the mixer,
  at least one row of aft FLADE fan blades disposed radially outwardly of and connected to the aft FLADE turbine, and
  the row of FLADE fan blades radially extending across a FLADE duct circumscribing the fan section.

2. An engine as claimed in claim 1 further comprising:
  a fan inlet to the fan section,
  an annular FLADE inlet to the FLADE duct, and
  the FLADE inlet is axially located substantially aftwardly of the fan section.

3. An engine as claimed in claim 2 wherein the FLADE inlet is axially located aftwardly of the core engine.

4. An engine as claimed in claim 1 further comprising the aft FLADE turbine connected to and rotatable with a low pressure turbine of the low pressure turbine section.

5. An engine as claimed in claim 4 further comprising:
  a fan inlet to the fan section,
  an annular FLADE inlet to the FLADE duct, and
  the FLADE inlet is axially located substantially aftwardly of the fan section.

6. An engine as claimed in claim 5 wherein the FLADE inlet is axially located aftwardly of the core engine.

7. An engine as claimed in claim 1 wherein the aft FLADE turbine is a free turbine.

8. An engine as claimed in claim 7 further comprising:
  a fan inlet to the fan section,
  an annular FLADE inlet to the FLADE duct, and
  the FLADE inlet is axially located substantially axially aftwardly of the fan section.

9. An engine as claimed in claim 8 wherein the FLADE inlet is located axially aftwardly of the core engine.

10. An engine as claimed in claim 1 further comprising at least one power extraction apparatus disposed within the engine and drivenly connected to the aft FLADE turbine.

11. An engine as claimed in claim 10 wherein the power extraction apparatus is an electrical generator.

12. An engine as claimed in claim 11 wherein the electrical generator is drivenly connected through a speed increasing gearbox to the aft FLADE turbine.

13. An engine as claimed in claim 10 wherein the power extraction apparatus is a power takeoff assembly including a housing within which is a power takeoff shaft drivenly connected to the aft FLADE turbine through a right angle gearbox.

14. An engine as claimed in claim 10 wherein the power extraction apparatus is disposed within a hollow engine nozzle centerbody of the engine located aft and downstream of the aft FLADE turbine.

15. An engine as claimed in claim 14 wherein the power extraction apparatus is an electrical generator disposed within the hollow engine nozzle centerbody.

16. An engine as claimed in claim 15 wherein the electrical generator is drivenly connected through a speed increasing gearbox to the aft FLADE turbine.

17. An engine as claimed in claim 14 wherein the power extraction apparatus is a power takeoff assembly including a housing disposed within the hollow engine nozzle centerbody and within which is a power takeoff shaft drivenly connected to the aft FLADE turbine through a right angle gearbox.

18. An engine as claimed in claim 1 further comprising a row of variable first FLADE vanes radially extending across the FLADE duct axially forwardly of the row of FLADE fan blades.

19. An engine as claimed in claim 18 further comprising:
  a fan inlet to the fan section,
  an annular FLADE inlet to the FLADE duct, and
  the FLADE inlet is axially located substantially aftwardly of the fan section.

20. An engine as claimed in claim 19 wherein the FLADE inlet is axially located aftwardly of the core engine.

21. An engine as claimed in claim 18 further comprising the aft FLADE turbine connected to and rotatable with a low pressure turbine of the low pressure turbine section.

22. An engine as claimed in claim 21 further comprising:
a fan inlet to the fan section,
an annular FLADE inlet to the FLADE duct, and
the FLADE inlet is axially located substantially aftwardly of the fan section.

23. An engine as claimed in claim 22 wherein the FLADE inlet is axially located aftwardly of the core engine.

24. An engine as claimed in claim 18 wherein the aft FLADE turbine is a free turbine.

25. An engine as claimed in claim 24 further comprising:
a fan inlet to the fan section,
an annular FLADE inlet to the FLADE duct, and
the FLADE inlet is axially located substantially axially aftwardly of the fan section.

26. An engine as claimed in claim 25 wherein the FLADE inlet is located axially aftwardly of the core engine.

27. An engine as claimed in claim 18 further comprising at least one power extraction apparatus disposed within the engine and drivenly connected to the aft FLADE turbine.

28. An engine as claimed in claim 27 wherein the power extraction apparatus is an electrical generator.

29. An engine as claimed in claim 28 wherein the electrical generator is drivenly connected through a speed increasing gearbox to the aft FLADE turbine.

30. An engine as claimed in claim 27 wherein the power extraction apparatus is a power takeoff assembly including a housing within which is a power takeoff shaft drivenly connected to the aft FLADE turbine through a right angle gearbox.

31. An engine as claimed in claim 27 wherein the power extraction apparatus is disposed within a hollow engine nozzle centerbody of the engine located aft and downstream of the aft FLADE turbine.

32. An engine as claimed in claim 18 further comprising a variable area turbine nozzle with variable turbine nozzle vanes located aft and downstream of the mixer and the low pressure turbine.

33. An engine as claimed in claim 18 further comprising:
a variable throat area engine nozzle downstream and axially aft of the mixer and the fan bypass duct,
a plurality of circumferentially disposed hollow struts in fluid flow communication with the FLADE duct, and
a substantially hollow centerbody supported by and in fluid flow communication with the hollow struts.

34. An engine as claimed in claim 33 further comprising cooling apertures in the centerbody and in a wall of the engine nozzle wherein the cooling apertures are in fluid communication with the FLADE duct.

35. An engine as claimed in claim 34 further comprising a variable area FLADE air nozzle including an axially translatable plug within the hollow centerbody and a radially outwardly positioned fixed nozzle cowling of the centerbody.

36. An engine as claimed in claim 33 further comprising:
aft thrust augmenting afterburners located aft and downstream of the aft FLADE turbine,
cooling apertures in the centerbody and in a wall located downstream of a throat area of the engine nozzle, and
the cooling apertures being in fluid communication with the FLADE duct.

37. An engine as claimed in claim 33 further comprising a forward afterburner axially disposed between the mixer and the aft FLADE turbine.

38. An aircraft comprising:
an aft FLADE gas turbine engine within a fuselage of the aircraft,
the gas turbine engine comprising;
a fan section drivenly connected to a low pressure turbine section,
a core engine located between the fan section and the low pressure turbine section,
a fan bypass duct circumscribing the core engine and in fluid communication with the fan section,
a mixer downstream of the low pressure turbine section and in fluid communication with the fan bypass duct,
an aft FLADE turbine downstream of the mixer,
at least one row of aft FLADE fan blades disposed radially outwardly of and connected to the aft FLADE turbine, and
the row of FLADE fan blades radially extending across a FLADE duct circumscribing the fan section.

39. An aircraft as claimed in claim 38 further comprising:
a fan inlet to the fan section,
an annular FLADE inlet to the FLADE duct, and
the FLADE inlet is axially located substantially aftwardly of the fan section.

40. An aircraft as claimed in claim 39 wherein the FLADE inlet is axially located aftwardly of the core engine.

41. An aircraft as claimed in claim 39 further comprising:
FLADE air intakes and an engine air intake mounted flush with respect to the fuselage,
the FLADE air intakes axially offset from the engine air intake,
the engine air intake connected to and in fluid communication with the fan inlet by an engine fixed inlet duct, and
the FLADE air intakes connected to and in fluid communication with the FLADE inlets by FLADE fixed inlet ducts.

42. An aircraft as claimed in claim 41 further comprising:
inlet duct passages of the engine and FLADE fixed inlet ducts respectively being two-dimensional and terminating in transition sections between the inlet duct passages and the fan and FLADE inlets respectively.

43. An aircraft as claimed in claim 42 further comprising a power extraction apparatus disposed within the engine and drivenly connected to the aft FLADE turbine.

44. An aircraft as claimed in claim 43 wherein the power extraction apparatus is an electrical generator.

45. An aircraft as claimed in claim 44 wherein the electrical generator is drivenly connected through a speed increasing gearbox to the aft FLADE turbine.

46. An aircraft as claimed in claim 43 wherein the power extraction apparatus is a power takeoff assembly including a housing and a power takeoff shaft drivenly connected to the aft FLADE turbine through a right angle gearbox within the housing.

47. An engine as claimed in claim 42 further comprising forward and aft electrical generators disposed within the engine forward and aft of the aft FLADE turbine and drivenly connected through forward and aft speed increasing gearboxes respectively to the aft FLADE turbine.

48. An aircraft as claimed in claim 41 further comprising:
at least one FLADE air exhaust duct leading from the FLADE duct to at least one FLADE exhaust nozzle offset from an engine nozzle downstream and axially aft of the mixer and the fan bypass duct,
an aircraft waste heat cooling system having an aircraft waste heat source within the aircraft, and a heat exchanger disposed in the FLADE air exhaust duct and in fluid heat exchange relationship with the aircraft waste heat cooling system.

49. An engine as claimed in claim 1 further comprising forward and aft electrical generators disposed within the engine forward and aft of the aft FLADE turbine and drivenly connected through forward and aft speed increasing gearboxes respectively to the aft FLADE turbine.

50. An engine as claimed in claim 18 further comprising forward and aft electrical generators disposed within the engine forward and aft of the aft FLADE turbine and drivenly connected through forward and aft speed increasing gearboxes respectively to the aft FLADE turbine.

51. An engine as claimed in claim 18 further comprising a fixed throat area engine nozzle downstream and axially aft of the mixer and the fan bypass duct.

52. An engine as claimed in claim 51 further comprising at least one power extraction apparatus disposed within the engine and drivenly connected to the aft FLADE turbine.

53. An engine as claimed in claim 52 wherein the power extraction apparatus is an electrical generator drivenly connected through a speed increasing gearbox to the aft FLADE turbine.

54. An engine as claimed in claim 52 wherein the power extraction apparatus is a power takeoff assembly including a housing within which is a power takeoff shaft drivenly connected to the aft FLADE turbine through a right angle gearbox.

* * * * *